United States Patent
Caskey, Jr. et al.

(10) Patent No.: US 10,308,891 B2
(45) Date of Patent: Jun. 4, 2019

(54) HYDRAULIC FLUID COMPOSITIONS

(71) Applicant: Houghton Technical Corp., Wilmington, DE (US)

(72) Inventors: Douglas C. Caskey, Jr., Lansdale, PA (US); Kenneth R. Cavanaugh, Pottstown, PA (US)

(73) Assignee: Houghton Technical Corp., Wilmington, DE (US)

( * ) Notice: Subject to any disclaimer, the term of this patent is extended or adjusted under 35 U.S.C. 154(b) by 503 days.

(21) Appl. No.: 14/914,225

(22) PCT Filed: Aug. 13, 2014

(86) PCT No.: PCT/US2014/050830
§ 371 (c)(1),
(2) Date: Feb. 24, 2016

(87) PCT Pub. No.: WO2015/031052
PCT Pub. Date: Mar. 5, 2015

(65) Prior Publication Data
US 2016/0208193 A1    Jul. 21, 2016

Related U.S. Application Data

(60) Provisional application No. 61/872,664, filed on Aug. 31, 2013.

(51) Int. Cl.
*E21B 7/12*     (2006.01)
*C09K 8/03*     (2006.01)
(Continued)

(52) U.S. Cl.
CPC ............. *C10M 169/04* (2013.01); *C09K 8/03* (2013.01); *C10M 103/00* (2013.01);
(Continued)

(58) Field of Classification Search
CPC .. C09K 8/03; C09K 8/528; C09K 8/54; E21B 7/00; E21B 7/12; E21B 33/13; E21B 33/14; E21B 43/04
See application file for complete search history.

(56) References Cited

U.S. PATENT DOCUMENTS

| | | | |
|---|---|---|---|
| 3,576,923 | A | 4/1971 | Randell et al. |
| 5,332,430 | A | 7/1994 | Gerigk et al. |

(Continued)

FOREIGN PATENT DOCUMENTS

| WO | WO-2007/135358 | 11/2007 |
|---|---|---|
| WO | WO2009/020494 | 2/2009 |

OTHER PUBLICATIONS

International Search Report dated Nov. 17, 2014 in corresponding International Patent Application No. PCT/US14/50830, filed Aug. 13, 2014.

(Continued)

*Primary Examiner* — Zakiya W Bates
(74) *Attorney, Agent, or Firm* — Howson & Howson LLP; Mary E. Bak

(57) ABSTRACT

A novel hydraulic fluid composition for application to drilling equipment is described herein. These hydraulic fluid compositions permit effective monitoring or controlling well-head pressure of a well during drilling on land or offshore. The hydraulic fluid compositions prevent uncontrolled flow of gas, oil, or another well fluid out of an underground formation during a drilling or extraction process when applied to the drilling equipment. Accordingly, provided is a hydraulic fluid concentrate which contains a water-soluble phosphate ester and a sulfide compound containing at least one S—S linkage, at least 10 carbon atoms and at least one terminal carboxylate group, wherein the S—S linkage bridges two alkyl groups. Additional components can be added to the concentrate and include one or (Continued)

more alkaline compound, one or more dicarboxylic acid or salt thereof, a water-soluble corrosion inhibitor, a water-soluble biocide, a pour point depressant, and water, ethylene glycol, or a combination thereof. The concentrate is then further diluted by the customer for use as described herein. Particularly, these compositions are effective in reducing seawater corrosion of a metal in contact with the hydraulic fluid composition, reducing bioaccumulation in oil drilling equipment contacted with the hydraulic fluid composition, and have low toxicity to sea life.

19 Claims, 1 Drawing Sheet

(51) Int. Cl.
*C10M 169/04* (2006.01)
*C10M 173/02* (2006.01)
*C10M 103/00* (2006.01)
*C10M 129/08* (2006.01)
*C10M 129/26* (2006.01)
*C10M 133/08* (2006.01)
*C10M 133/44* (2006.01)
*C10M 135/02* (2006.01)
*C10M 137/04* (2006.01)
*C10M 137/12* (2006.01)
*E21B 7/00* (2006.01)

(52) U.S. Cl.
CPC ........ *C10M 129/08* (2013.01); *C10M 129/26* (2013.01); *C10M 133/08* (2013.01); *C10M 133/44* (2013.01); *C10M 135/02* (2013.01); *C10M 137/04* (2013.01); *C10M 137/12* (2013.01); *C10M 173/02* (2013.01); *E21B 7/00* (2013.01); *E21B 7/12* (2013.01); *C10M 2207/022* (2013.01); *C10M 2207/123* (2013.01); *C10M 2207/127* (2013.01); *C10M 2215/042* (2013.01); *C10M 2215/222* (2013.01); *C10M 2215/223* (2013.01); *C10M 2219/02* (2013.01); *C10M 2219/085* (2013.01); *C10M 2223/04* (2013.01); *C10M 2223/043* (2013.01); *C10N 2230/06* (2013.01); *C10N 2230/26* (2013.01); *C10N 2240/08* (2013.01)

(56) References Cited

U.S. PATENT DOCUMENTS

| | | | |
|---|---|---|---|
| 5,750,478 | A | 5/1998 | Kim et al. |
| 6,030,543 | A | 2/2000 | Placek et al. |
| 6,048,825 | A | 4/2000 | Markson et al. |
| 8,276,663 | B2 | 10/2012 | Holtsclaw et al. |
| 8,287,754 | B1 | 10/2012 | Bredsguard et al. |
| 2005/0187118 | A1 | 8/2005 | Haraguchi et al. |
| 2009/0036331 | A1 | 2/2009 | Smith et al. |
| 2010/0016187 | A1 | 1/2010 | Smith |

OTHER PUBLICATIONS

Written Opinion dated Nov. 17, 2014 in corresponding International Patent Application No. PCT/US14/50830, filed Aug. 13, 2014.
International Preliminary Report on Patentability dated Mar. 10, 2016 in corresponding International Patent Application No. PCT/US14/50830, filed Aug. 13, 2014.
Danehy, JP et al, The Alkaline Decomposition of Organic Disulfides. II. Alternative Pathways as Determined by Structure., Jul. 1967, J Org. Chem., 32(7): 2047-2053.
March's Advanced Organic Chemistry, ed. Smith, M. B., APA, $6^{th}$ Edit., 2001, p. 1555.
Singh, R. and Whitesides, G. M., "Thiol-disulfide interchange" in Sulfur Containing Functional Groups, John Wiley & Sons 1993, Eds. S. Patai et al, Chapter 13).
Extended European Search Report and Supplementary European Search Report and European Search Opinion dated May 17, 2017 in corresponding European Patent Application No. 14839620.3, filed Aug. 13, 2014.
Response to Extended EP Search Report and Opinion dated Dec. 8, 2017 in corresponding European Patent Application No. 14839620.3, filed Aug. 13, 2014.

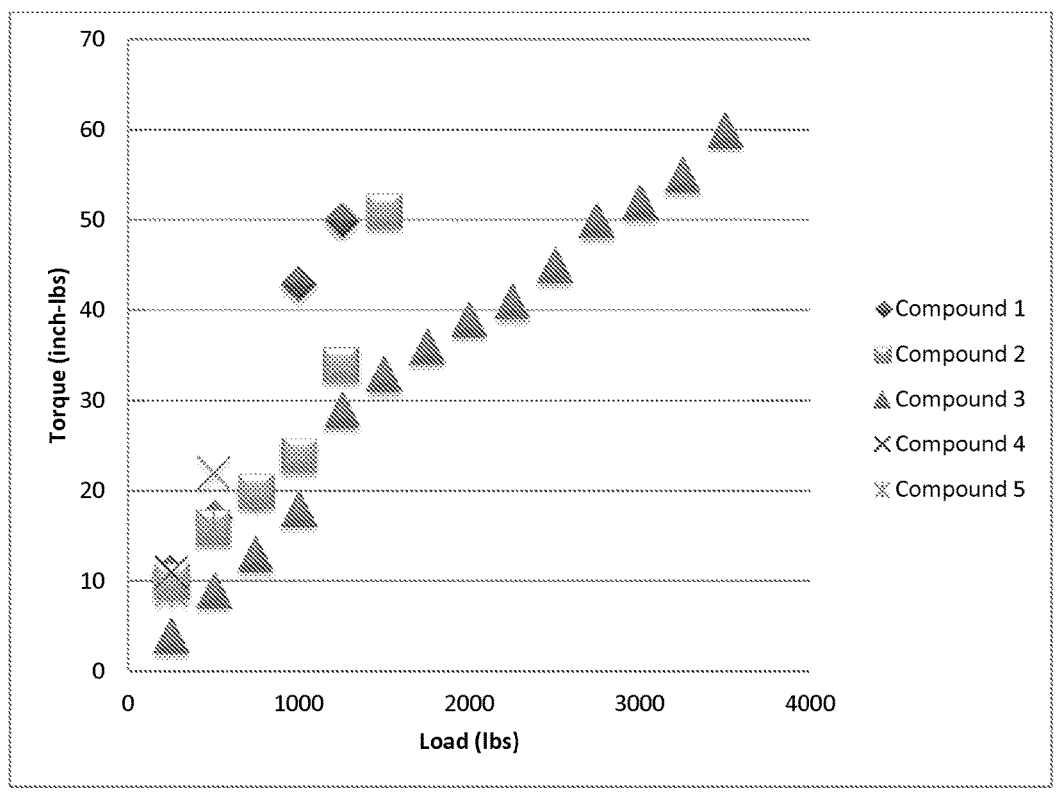

HYDRAULIC FLUID COMPOSITIONS

CROSS-REFERENCE TO RELATED APPLICATIONS

This application is a national stage of International Patent Application No. PCT/US2014/050830, filed Aug. 13, 2014, which claims the benefit of the priority of U.S. Provisional Patent Application No. 61/872,664, filed Aug. 31, 2013 (expired), which applications are incorporated herein by reference.

BACKGROUND OF THE INVENTION

Hydraulic fluids are usable in blowout preventer (BOP) devices to control well-head pressure of a well that is being drilled and/or in marine environments. A "blowout" is defined as uncontrolled flow of gas, oil, or other well fluids out of an underground formation. A blowout can occur when formation pressure exceeds the pressure applied to it by the drilling or extraction apparatus. A BOP is a specialized valve, usually installed redundantly, in series, to seal, control and monitor oil and gas wells. The BOP is actuated by hydraulic pressure that forms a seal around the drill string to seal off well head pressure when an area of high pressure has been contacted.

There are several challenges for the fluid which delivers the hydraulic pressure. For example, use of conventional hydraulic fluids can be complicated by low flash points and poor fire resistance. Also, toxicity, bioaccumulation, and biodegradation of conventional fluids can lead to environmental concern as well as lead to bacterial infestations arising in the fluid, especially from anaerobic bacteria such as sulfate reducing bacteria which are prevalent in sea water. Another challenge with conventional fluids is compatibility with sea water which often leads to emulsions or precipitation. Corrosion is also a concern and, in general, long term stability of the fluid at elevated temperatures with the entire system which is contacted by the fluid.

What is needed in the art is a BOP hydraulic fluid which addresses all of these concerns and at the same time provides adequate lubricity and wear characteristics.

SUMMARY OF THE INVENTION

In one aspect, a hydraulic fluid concentrate is provided and contains (i) a water-soluble phosphate ester and (ii) a sulfide compound comprising at least one S—S linkage, at least 10 carbon atoms and at least one terminal carboxylate group, wherein the S—S linkage bridges two alkyl groups.

In another aspect, a hydraulic fluid concentrate is provided and contains (i) a water-soluble phosphate ester, (ii) a sulfide compound comprising at least one S—S linkage, at least 10 carbon atoms and at least one terminal carboxylate group, wherein the S—S linkage bridges two alkyl groups, (iii) one or more alkaline compound, (iv) one or more dicarboxylic acid or salt thereof, (v) a water-soluble corrosion inhibitor, (vi) a water-soluble biocide, (vii) a pour point depressant, and (viii) water, ethylene glycol, or a combination thereof.

In a further aspect, a hydraulic fluid composition is provided and contains about 1 to about 10% w/w of a hydraulic fluid concentrate described herein and (b) about 90 to about 99% w/w of water, ethylene glycol, or a combination thereof. In one embodiment, the hydraulic fluid composition reduces seawater corrosion of a metal in contact with the hydraulic fluid composition. In another embodiment, the hydraulic fluid composition reduces bioaccumulation in oil drilling equipment in contact with the hydraulic fluid composition. In a further embodiment, the hydraulic fluid composition has low toxicity to sea life.

In yet another aspect, a product is provided and contains (i) a first container containing a water-soluble phosphate ester, (ii) a second container containing a sulfide compound containing at least one —S—S— linkage, at least 10 carbon atoms and at least one terminal carboxylate group, wherein said —S—S— linkage bridges two alkyl groups, (iii) a third container containing one or more alkaline compound, (iv) a fourth container containing one or more dicarboxylic acid or salt thereof, (v) a fifth container containing a water-soluble corrosion inhibitor, (vi) a sixth container containing a water-soluble biocide, and (vii) a seventh container containing a pour point depressant.

In still a further aspect, a method for monitoring or controlling well-head pressure of a well during drilling is provided and includes performing the drilling using a hydraulic fluid composition described herein.

In another aspect, a method for preventing uncontrolled flow of gas, oil, or another well fluid out of an underground formation during a drilling or extraction process is provided and includes performing the drilling or extraction using a hydraulic fluid composition described herein.

In yet a further aspect, a method for drilling offshore oil or gas is provided and includes applying a hydraulic fluid composition described herein to the drilling equipment and drilling the offshore oil using the drilling equipment. In one embodiment, the hydraulic fluid composition is applied to the blowout preventer of the drilling equipment.

Other aspects and advantages of the invention will be readily apparent from the following detailed description of the invention.

DETAILED DESCRIPTION OF THE FIGURE

FIG. 1 is a plot of the load (lbs) vs. torque (inch-lbs) for 5 compositions encompassed as described herein and as performed as described in Example 2.

DETAILED DESCRIPTION OF THE INVENTION

Described herein are aqueous hydraulic fluid compositions, especially hydraulic fluids which are intended to be used in BOP devices to control wellhead pressures. To satisfy the industry needs, above, the inventors developed hydraulic fluid compositions containing at least water-soluble phosphate ester and a sulfide compound. The combination of these two components provide increased lubricity, reduced wear, and improved hard water stability compared to fluids containing a only one phosphate ester or a only sulfurized fatty acids. A consequence of these properties leads to improved field performance.

Of the many advantages conveyed by the hydraulic fluid compositions described herein, the hydraulic fluid compositions reduce seawater corrosion of a metal in contact with the hydraulic fluid composition. The hydraulic fluid compositions also reduce bioaccumulation in oil drilling equipment in contact with the hydraulic fluid composition. In addition, the hydraulic fluid compositions have low toxicity to sea life. All of these advantages thereby provide a superior hydraulic fluid composition.

A. Definitions

The term "metal" as used herein refers to any commercial metal that requires use of a hydraulic fluid. In one embodiment, the metal contains only one metallic element. In another embodiment, the metal contains more than one metal element, i.e., a metal alloy. For example, the metal may contain one or more of iron, manganese, copper, silicon, sulfur, phosphorus, aluminum, chromium, cobalt, columbium, molybdenum, nickel, titanium, tungsten, vanadium, zirconium, among others. Specific examples of metals that can be treated with the compositions described herein include those described in the "Handbook of Hydraulic Fluid Technology", $2^{nd}$ ed., Totten, CRC Press, 2011, which is herein incorporated by reference.

The term "alkyl" is used herein to refer to both straight- and branched-chain saturated aliphatic hydrocarbon groups. In one embodiment, an alkyl group has 1 to about 30 carbon atoms (i.e., $C_1$, $C_2$, $C_3$, $C_4$, $C_5$ $C_6$, $C_7$, $C_8$, $C_9$, or $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, or $C_{30}$). In a further embodiment, an alkyl group has 1 to about 10 carbon atoms (i.e., $C_1$, $C_2$, $C_3$, $C_4$, $C_5$ $C_6$, $C_7$, $C_8$, $C_9$, or $C_{10}$). In another embodiment, an alkyl group has 4 to about 10 carbon atoms (i.e., $C_4$, $C_5$, $C_6$, $C_7$, $C_8$, $C_9$, or $C_{10}$). In a further embodiment, an alkyl group has 5 to about 10 carbon atoms (i.e., $C_5$, $C_6$, $C_7$, $C_8$, $C_9$, or $C_{10}$).

The term "cycloalkyl" is used herein to refer to cyclic, saturated aliphatic hydrocarbon groups. In one embodiment, a cycloalkyl group has 4 to about 10 carbon atoms (i.e., $C_4$, $C_5$, $C_6$, $C_7$, $C_8$, $C_9$, or $C_{10}$). In another embodiment, a cycloalkyl group has 5 to about 10 carbon atoms (i.e., $C_5$, $C_6$, $C_7$, $C_8$, $C_9$, or $C_{10}$).

The term "alkenyl" is used herein to refer to both straight- and branched-chain alkyl groups having one or more carbon-carbon double bonds. In one embodiment, an alkenyl group has 2 to about 30 carbon atoms (i.e., $C_1$, $C_2$, $C_3$, $C_4$, $C_5$ $C_6$, $C_7$, $C_8$, $C_9$, or $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, or $C_{30}$). In a further embodiment, an alkenyl group has 2 to about 10 carbon atoms (i.e., $C_2$, $C_3$, $C_4$, $C_5$ $C_6$, $C_7$, $C_8$, $C_9$, or $C_{10}$). In another embodiment, an alkenyl group has 4 to about 10 carbon atoms (i.e., $C_4$, $C_5$, $C_6$, $C_7$, $C_8$, $C_9$, or $C_{10}$). In a further embodiment, an alkenyl group has 5 to about 10 carbon atoms (i.e., $C_5$, $C_6$, $C_7$, $C_8$, $C_9$, or $C_{10}$). In another embodiment, an alkenyl group has 1 or 2 carbon-carbon double bonds.

The term "alkynyl" is used herein to refer to both straight- and branched-chain alkyl groups having one or more carbon-carbon triple bonds. In one embodiment, an alkynyl group has 2 to about 30 carbon atoms (i.e., $C_1$, $C_2$, $C_3$, $C_4$, $C_5$ $C_6$, $C_7$, $C_8$, $C_9$, or $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, or $C_{30}$). In a further embodiment, an alkynyl group has 2 to about 10 carbon atoms (i.e., $C_2$, $C_3$, $C_4$, $C_5$ $C_6$, $C_7$, $C_8$, $C_9$, or $C_{10}$). In another embodiment, an alkynyl group has 4 to about 10 carbon atoms (i.e., $C_4$, $C_5$, $C_6$, $C_7$, $C_8$, $C_9$, or $C_{10}$). In a further embodiment, an alkynyl group has 5 to about 10 carbon atoms (i.e., $C_5$, $C_6$, $C_7$, $C_8$, $C_9$, or $C_{10}$). In another embodiment, an alkynyl group contains 1 or 2 carbon-carbon triple bonds.

The term "alkylamino" refers to the —NHR" or —NR"R"', wherein R" and R"' are, independently, alkyl groups as defined above. The alkyl groups can be the same or different.

The term "halogen" as used herein refers to Cl, Br, F, or I groups.

The term "aryl" as used herein refers to an aromatic, carbocyclic system, e.g., of about 6 to 14 carbon atoms, which can include a single ring or multiple aromatic rings fused or linked together where at least one part of the fused or linked rings forms the conjugated aromatic system. The aryl groups include, but are not limited to, phenyl, naphthyl, biphenyl, anthryl, tetrahydronaphthyl, phenanthryl, indene, benzonaphthyl, and fluorenyl.

The term "heterocycle" or "heterocyclic" as used herein can be used interchangeably to refer to a stable, saturated or partially unsaturated 3- to 9-membered monocyclic or multicyclic heterocyclic ring. The heterocyclic ring has in its backbone carbon atoms and one or more heteroatoms including nitrogen, oxygen, and sulfur atoms. In one embodiment, the heterocyclic ring has 1 to about 4 heteroatoms in the backbone of the ring. When the heterocyclic ring contains nitrogen or sulfur atoms in the backbone of the ring, the nitrogen or sulfur atoms can be oxidized. The term "heterocycle" or "heterocyclic" also refers to multicyclic rings in which a heterocyclic ring is fused to an aryl ring of about 6 to about 14 carbon atoms. The heterocyclic ring can be attached to the aryl ring through a heteroatom or carbon atom provided the resultant heterocyclic ring structure is chemically stable. In one embodiment, the heterocyclic ring includes multicyclic systems having 1 to 5 rings.

A variety of heterocyclic groups are known in the art and include, without limitation, oxygen-containing rings, nitrogen-containing rings, sulfur-containing rings, mixed heteroatom-containing rings, fused heteroatom containing rings, and combinations thereof. Examples of heterocyclic groups include, without limitation, tetrahydrofuranyl, piperidinyl, 2-oxopiperidinyl, pyrrolidinyl, morpholinyl, thiamorpholinyl, thiamorpholinyl sulfoxide, pyranyl, pyronyl, dioxinyl, piperazinyl, dithiolyl, oxathiolyl, dioxazolyl, oxathiazolyl, oxazinyl, oxathiazinyl, benzopyranyl, benzoxazinyl and xanthenyl.

The term "heteroaryl" as used herein refers to a stable, aromatic 5- to 14-membered monocyclic or multicyclic heteroatom-containing ring. The heteroaryl ring has in its backbone carbon atoms and one or more heteroatoms including nitrogen, oxygen, and sulfur atoms. In one embodiment, the heteroaryl ring contains 1 to about 4 heteroatoms in the backbone of the ring. When the heteroaryl ring contains nitrogen or sulfur atoms in the backbone of the ring, the nitrogen or sulfur atoms can be oxidized. The term "heteroaryl" also refers to multicyclic rings in which a heteroaryl ring is fused to an aryl ring. The heteroaryl ring can be attached to the aryl ring through a heteroatom or carbon atom provided the resultant heterocyclic ring structure is chemically stable. In one embodiment, the heteroaryl ring includes multicyclic systems having 1 to 5 rings.

A variety of heteroaryl groups are known in the art and include, without limitation, oxygen-containing rings, nitrogen-containing rings, sulfur-containing rings, mixed heteroatom-containing rings, fused heteroatom containing rings, and combinations thereof. Examples of heteroaryl groups include, without limitation, furyl, pyrrolyl, pyrazolyl, imidazolyl, triazolyl, pyridyl, pyridazinyl, pyrimidinyl, pyrazinyl, triazinyl, azepinyl, thienyl, dithiolyl, oxathiolyl, oxazolyl, thiazolyl, oxadiazolyl, oxatriazolyl, oxepinyl, thiepinyl, diazepinyl, benzofuranyl, thionapthene, indolyl, benzazolyl, purindinyl, pyranopyrrolyl, isoindazolyl, indoxazinyl, benzoxazolyl, quinolinyl, isoquinolinyl, benzodiazonyl, napthylridinyl, benzothienyl, pyridopyridinyl, acridinyl, carbazolyl, and purinyl rings.

The term "thioaryl" as used herein refers to the S(aryl) group, where the point of attachment is through the sulfur-atom and the aryl group can be substituted as noted herein. The term "alkoxy" as used herein refers to the O(alkyl) group, where the point of attachment is through the oxygen-atom and the alkyl group can be substituted as noted herein. The term "thioalkyl" as used herein refers to the S(alkyl) group, where the point of attachment is through the sulfur-atom and the alkyl group can be substituted as noted herein.

The term "hydroxyalkyl" refers to -(alkyl)OH, where the point of attachment is group through the alkyl group and the alkyl groups is defined above.

The term "alkylcarbonyl" as used herein refers to the C(O)(alkyl) group, wherein the point of attachment is through the carbon-atom and the alkyl group can be substituted as noted herein.

The term "alkylcarboxy" as used herein refers to the C(O)O(alkyl) group, wherein the point of attachment is through the carbon-atom and the alkyl group can be substituted as noted herein.

The term "optionally substituted" as used herein refers to the base group having one or more substituents including, without limitation, H, halogen, CN, OH, $NO_2$, amino, alkyl, cycloalkyl, alkenyl, alkynyl, $C_1$ to $C_3$ perfluoroalkyl, $C_1$ to $C_3$ perfluoroalkoxy, aryl, heterocyclic, heteroaryl, alkoxy, aryloxy, alkylcarbonyl, alkylcarboxy, arylthio, alkylamino, or —$SO_2$-(optionally substituted $C_1$ to $C_{10}$ alkyl).

The term "water-soluble" as used herein refers to the ability of a chemical component to combine with or disperse in water. Desirably, the chemical component substantially dissolves in water. More desirably, the term "water-soluble" refers to a compound has 100% dissolution in water.

The phrase "in contact with", when utilized to refer to a metal's interaction with the hydraulic fluid described herein, includes any point of contact of the metal with the hydraulic fluid. Such contact includes, without limitation, application of the hydraulic fluid to the metal using conventional techniques. Such conventional techniques include, without limitation, coating, spraying, contact rolling, squeegeeing, dipping, brushing, flooding, or immersion application techniques. In one embodiment, the metal is contacted with the hydraulic fluid prior to use of the metal in the desired method. In another embodiment, the metal is contacted with the hydraulic fluid during use of the metal in the desired method.

"Contact rolling" as used herein is meant to describe application of a liquid by first soaking a rolling applicator in the composition and then pressing and rolling the wetted applicator to the metal surface.

"Squeegeeing" as used herein is meant to describe application of pouring the composition on to the metal surface and then spreading it uniformly using a smooth rubber applicator.

It should be understood that while various embodiments in the specification are presented using "comprising" language, under various circumstances, a related embodiment is also be described using "consisting of" or "consisting essentially of" language.

It is to be noted that the term "a" or "an" refers to one or more. As such, the terms "a" (or "an"), "one or more," and "at least one" are used interchangeably herein.

As used herein, the term "about" means a variability of 10% from the reference given, unless otherwise specified.

Unless defined otherwise in this specification, technical and scientific terms used herein have the same meaning as commonly understood by one of ordinary skill in the art to which this invention belongs and by reference to published texts, which provide one skilled in the art with a general guide to many of the terms used in the present application.

B. The Concentrate

Described herein is a concentrate which contains two components, i.e., (i) a water-soluble phosphate ester and a sulfide compound. This concentrate may be utilized by those skilled in the art for preparing a hydraulic fluid composition useful in the coating metal substrates. It is desirable to provide a functional hydraulic fluid which has excellent wear and viscosity characteristics over a wide temperature range and which has improved properties necessary for a good hydraulic fluid, including freedom from corrosion. It is also desired that the hydraulic fluid have reduced wear on metallic parts and a low specific gravity. In one embodiment, the concentrate has a pour point of about −10° C. or less. In another embodiment, the concentrate is a liquid at a temperature of 10° C. or greater.

(i) Water-Soluble Phosphate Ester

As a first component, the hydraulic fluid concentrate contains a water-soluble phosphate ester. Desirably, the water-soluble phosphate ester is selected to ensure an acceptable density and viscosity of the hydraulic fluid.

In one embodiment, the water-soluble phosphate ester has the structure:

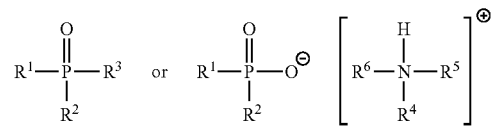

In these structures, $R^1$, $R^2$, and $R^3$ are, independently, H, OH, optionally substituted $C_1$ to $C_{30}$ alkyl, optionally substituted $C_1$ to $C_{30}$ alkoxy, optionally substituted aryl, optionally substituted —O—$(CH_2O)_n$—($C_1$ to $C_{30}$ alkyl), optionally substituted —O—$(CH_2O)_n$—($C_2$ to $C_{30}$ alkenyl), optionally substituted —O—$(CH_2O)_n$—($C_2$ to $C_{30}$ alkynyl), —O—$(CH_2CH_2O)_n$—($C_1$ to $C_{30}$ alkyl), —O—$(CH_2CH_2O)_n$—($C_2$ to $C_{30}$ alkenyl), —O—$(CH_2CH_2O)_n$—($C_2$ to $C_{30}$ alkynyl), —O—$(CH_2CH(CH_3)O)_n$—($C_1$ to $C_{30}$ alkyl), —O—$(CH_2CH(CH_3)O)_n$—($C_2$ to $C_{30}$ alkenyl), —O—$(CH_2CH(CH_3)O)_n$—($C_2$ to $C_{30}$ alkynyl), —O—$(CH_2CH_2O)_n(CH_2CH(CH_3)O)_n$—($C_1$ to $C_{30}$ alkyl), —O—$(CH_2CH_2O)_n$ $(CH_2CH(CH_3)O)_n$—($C_2$ to $C_{30}$ alkenyl), —O—$(CH_2CH_2O)_n(CH_2CH(CH_3)O)_n$—($C_2$ to $C_{30}$ alkynyl), —O—($C_1$ to $C_{30}$ alkyl)-$(OCH_2)_n$—($C_1$ to $C_{30}$ alkyl), optionally substituted —O—($C_1$ to $C_{30}$ alkyl)-$(OCH_2CH_2)_n$—($C_1$ to $C_{30}$ alkyl), optionally substituted —O—($C_1$ to $C_{30}$ alkyl)-$(OCH_2CH(CH_3))_n$—($C_1$ to $C_{30}$ alkyl), optionally substituted —O—($C_1$ to $C_{30}$ alkyl)-$(OCH_2)_n$—($C_2$ to $C_{30}$ alkenyl), optionally substituted —O—($C_1$ to $C_6$ alkyl)$OR^A OR^B$, $C_1$ to $C_{30}$ alkyl comprising an amine group, $C_2$ to $C_{30}$ alkenyl comprising an amine group, or $C_2$ to $C_{30}$ alkynyl comprising an amine group.

$R^A$ and $R^B$ are, independently, $C_1$ to $C_{30}$ alkyl, $C_2$ to $C_{30}$ alkenyl, or $C_2$ to $C_{30}$ alkynyl.

$R^4$ to $R^6$ are, independently, H, optionally substituted $C_1$ to $C_{12}$ hydroxyalkyl, or optionally substituted $C_1$ to $C_{12}$ thioalkyl.

In another embodiment, the water-soluble phosphate ester is a $C_6$ to $C_{18}$ trialkoxyalkyl phosphate ester. See, U.S. Pat. No. 6,030,543 which is incorporated by reference herein. Each alkoxyalkyl moiety of the phosphate ester contains 1 part by weight of an ester or a mixture of esters selected from among a trialkyl ester of phosphoric acid and $C_4$ to $C_9$ alkyl alcohols, a triaryl phosphate ester wherein the aryl groups are partially $C_{3-4}$ alkylated phenols, and a trialkyl phosphate ester having a pour point of less than −50° C., each alkyl group of the trialkyl phosphate ester containing from 8 to 12 carbon atoms. In one aspect, the water-soluble phosphate ester is a $C_6$ to $C_{10}$ trialkyloxyalkyl phosphate ester which contains butoxyethyl, phenoxyethyl, octoxyethyl, or butoxybutyl moieties.

In a further embodiment, the water-soluble phosphate ester is a trialkyl phosphate ester, wherein the alkyl groups are the same or different. In one aspect, the water-soluble phosphate ester is tributyl phosphate, triisooctyl phosphate, or dibutyl octyl phosphate.

In another embodiment, the phosphate ester may be a mixed ester containing at least one partially alkylated with a $C_{3-4}$ alkyl group. In aspect, the phosphate ester may be selected from among 4-isopropylphenyl diphenyl phosphate or 3-butylphenyl diphenyl phosphate.

In still another embodiment, the water-soluble phosphate ester is a triaryl phosphate ester. One of skill in the art would be able to select a suitable triaryl phosphate ester for use herein. The triaryl phosphate may be purchased from commercial vendors or produced by partially alkylating phenol with butylene or propylene to form a mixed phenol which is then reacted with phosphorus oxychloride as described in U.S. Pat. No. 3,576,923, which is incorporated by reference herein. A mixed triaryl phosphate ester may also be used in the compositions discussed herein. In one aspect, the mixed triaryl phosphate may be selected from among cresyl diphenyl phosphate, tricresyl phosphate, mixed xylyl cresyl phosphates, lower alkylphenyl/phenyl phosphates, such as mixed isopropylphenyl/phenyl phosphates, and t-butylphenyl/phenyl phosphates, among others.

In a further embodiment, the water-soluble phosphate ester is selected from the phospholipids described in International Patent Publication No. WO-2007/135358, which is herein incorporated by reference. In one aspect, the phosphate ester has the following structure:

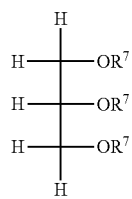

In this structure, at least one $R^7$ is a fatty acyl group and at least one $R^7$ is the following group, wherein R' is $C_1$ to $C_{12}$ alkyl, $C_2$ to $C_{12}$ alkenyl or $C_2$ to $C_{12}$ alkynyl, each $R^8$ is, independently, H, $C_1$ to $C_8$ alkyl, $C_2$ to $C_{12}$ alkenyl or $C_2$ to $C_{12}$ alkynyl, and $R^{12}$ is H, OH, or $C_1$ to $C_{12}$ alkyl.

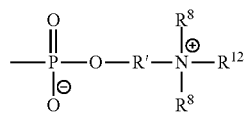

The fatty acyl group of $R^7$ may be derived from a $C_4$ to $C_{30}$ fatty acid. In one embodiment, the fatty acyl group of $R^7$ is derived from fatty acids selected from among octanoic acid, stearic acid, oleic acid, palmitic acid, behenic acid, myristic acid and oleosteric acid. In another embodiment, two $R^7$ groups are fatty acyl groups. In a further embodiment, the water-soluble phosphate ester is phosphatidylcholine, phosphatidylinositol, phosphatidylserine, or phosphatidyethanolamine.

In a further embodiment, the water-soluble phosphate ester is a lipid containing phosphoric acid derivative such as those described in European Patent No. 2,171,011, which is incorporated by reference herein. Desirably, the lipid containing phosphoric acid derivative is selected from among phosphatidylcholine, phosphatidylserine, phosphatidylinositol, phosphatidylethanolamine, phosphatidic acid, and combinations thereof.

In another embodiment, the water-soluble phosphate ester is a glycerophospholipid.

In a further embodiment, the water-soluble phosphate ester is olelyl alcohol ethoxylated phosphate.

The hydraulic fluid composition contains about 0.5 to about 10% w/w, i.e., 0.5, 1, 2, 3, 4, 5, 6, 7, 8, 9, or 10 or fractions there between, of the phosphate ester. In one embodiment, the hydraulic fluid composition contains about 2 to about 5% w/w of the phosphate ester. In another embodiment, the hydraulic fluid composition contains about 2.5% w/w of the phosphate ester.

(ii) Sulfide Compound

As a second component, the hydraulic fluids described herein contain a sulfide compound. The sulfide compound must be water-soluble when combined with the phosphate ester. A suitable sulfide compound may be selected from a commercial vendor or may be synthesized from reagents available in the art. In one embodiment, the sulfide compound utilized herein is synthesized by neutralizing a carboxylic acid terminated sulfide compound available in the art. The neutralization may be performed using a suitable base or the like, readily selected by those skilled in the art, and produces a sulfide compound have at least one terminal carboxylate group. The terminal carboxylate group is dependent on the base utilized for the neutralization. Typically, the carboxylic acid terminated sulfide compound is neutralized using an amine. In one embodiment, the amine is monoethanolamine, among others.

Desirably, the sulfide compound contains at least one S—S— linkage. However, the sulfide compound may contain additional sulfur atoms on the S—S— linkage. In one embodiment, the sulfide compound contains a —S—S—S- linkage. In another embodiment, the sulfide compound contains a —S—S—S—S— linkage. Typically, the sulfide compound contains only one sulfur linkage in the molecule, but may contain 2 or more as determined by one skilled in the art. The sulfur linkage, i.e., a —S—S—, —S—S—S—, or —S—S—S—S— group, of the sulfide compound bridges two alkyl groups to form a dimer. The sulfur linkages and binding to the alkyl groups is pictorially described below.

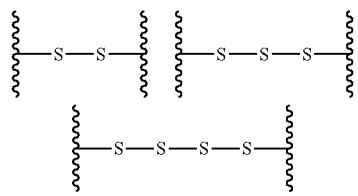

The alkyl chains of the sulfide compound contain at least 5 carbon atoms. In another embodiment, the alkyl chains of the sulfide compound contain about 5 to about 25, i.e., about 5, 6, 7, 8, 9, 10, 11, 12, 13, 14, 15, 16, 17, 18, 19, 20, 21, 22, 23, 24, or 25, carbon atoms. In yet another embodiment, the alkyl chains of the sulfide compound contain about 10 to about 20 carbon atoms. In a further embodiment, the alkyl chains contain the same number of carbon atoms. In another embodiment, the alkyl chains have differing numbers of carbon atoms. At least one of the alkyl groups of the sulfide compound utilized herein is terminated with a carboxylate group. In one embodiment, one alkyl group of the sulfide compound utilized herein is terminated with a carboxylate group. In another embodiment, both alkyl groups of the sulfide compound utilized herein are terminated with carboxylate groups. In a further embodiment, one alkyl group of the sulfide compound is terminated with an amide functional group. In yet another embodiment, both alkyl groups of the sulfide compound are terminated with amide functional groups. In still a further embodiment, the sulfide compound is prepared by sulfurizing 9-octadecenoic acid. In yet another embodiment, the sulfurized 9-octadecenoic acid contains two octadecanoxylate groups joined by a —S—S— linkage. In a further embodiment, one or more of the octadecanoxylate groups contain a terminal amide group on the alkyl substituent. See, e.g., the S-containing additives described in U.S. Pat. No. 5,750,478, which is incorporated by reference herein.

Desirably, the hydraulic fluid concentrate contains an excess of the sulfide compound. In one embodiment, the ratio of the phosphate ester to the sulfide compound is about 1:1 to about 4:1, i.e., about 1:1, 1.5:1, 2:1, 2.5:1, 3:1, 3.5:1, or 4:1 or fractions there between.

The hydraulic fluid composition contains about 1 to about 10% w/w, i.e., 1, 2, 3, 4, 5, 6, 7, 8, 9, or 10 or fractions there between, of the sulfide compound. In one embodiment, the hydraulic fluid composition contains about 2 to about 5% w/w of the sulfide compound. In another embodiment, the hydraulic fluid composition contains about 3% w/w of the sulfide compound.

(iii) Additional Components

The hydraulic fluid may also contain one or more additional components, as identified below. In one embodiment, the additional components present in the hydraulic fluid composition may include water, ethylene glycol (EG), or combinations thereof. The water and/or EG may be included in the hydraulic fluid composition, thereby permitting use of the product by the customer without addition of further water and/or EG. Alternatively, water and/or EG is present in the hydraulic fluid composition in sufficient amounts to provide a stable solution for further dilution by the customer prior to use. Water and/or EG may also be added by the customer to a hydraulic fluid concentrate prior to use. However, more water and/or EG may be added to the composition to ensure that the final hydraulic fluid composition contains sufficient water and/or EG for use by the customer.

(a) Alkaline Compound

The compositions optionally include one or more of an alkaline compound. The phrase "alkaline compound" as used herein refers to any chemical compound that when used in the described composition maintains a pH of greater than about 7. The alkaline compound can also provide biostability to the compositions.

A number of alkaline compounds are known in the art and are commercially available from numerous manufacturers. Such alkaline compounds include, without limitation, alkanolamines, alkali hydroxides, alkaline metal hydroxides, alkylamines, and N-alkylalkanol amines, among others. In one embodiment, the alkanolamine is monoethanolamine, triethanolamine, aminomethyl propanol, monoisopropanol amine, triisopropanol amine, diglycolamine, or combinations thereof. In another embodiment, the alkaline compound is monoethanolamine, triethanolamine, or a combination thereof. In another embodiment, the hydroxide reagent is sodium hydroxide or potassium hydroxide. In a further embodiment, the alkylamine is $C_{12}$ to $C_{14}$ t-alkylamine.

In one embodiment, the hydraulic fluid composition contains about 1% to about 12% w/w, i.e., 1, 2, 3, 4, 5, 6, 7, 8, 9, 10, 11, or 12% w/w or fractions there between, of the alkaline compound. In another embodiment, the hydraulic fluid composition contains about 8% to about 12% w/w of the alkaline compound.

(b) Dicarboxylic Acid

The hydraulic fluid composition may also contain a dicarboxylic acid or salt thereof. Desirably, the dicarboxylic acid is an alkanedioic acid and has a low reactivity with the other components of the composition. In one embodiment herein, the dicarboxylic acid contains about 5 to about 18 carbon atoms, i.e., 5, 6, 7, 8, 9, 10, 11, 12, 13, 14, 15, 16, 17, or 18. In a further embodiment, the dicarboxylic acid contains about 5 to about 13 carbon atoms. In another embodiment, the dicarboxylic acid contains about 10 to about 12 carbon atoms. Suitable dicarboxylic acids therefore include, but are not limited to, dodecanedioic acid, undecanedioic acid, sebacic acid, and combinations thereof.

The hydraulic fluid composition desirably contains sufficient amounts of the dicarboxylic acid to prevent corrosion. In one embodiment, the hydraulic fluid composition contains about 1% to about 10% w/w, i.e., 1, 2, 3, 4, 5, 6, 7, 8, 9, or 10% w/w or fractions there between, of the dicarboxylic acid. In another embodiment, the hydraulic fluid composition contains about 2% to about 4% w/w of the dicarboxylic acid.

(c) Corrosion Inhibitor

One or more of a corrosion inhibitor, which prevents the corrosion of the drilling equipment, is optionally included as another component of the compositions. The corrosion inhibitor should be water-soluble and not react with the other components of the composition.

A number of corrosion inhibitors are known in the art and are commercially available from numerous manufacturers. Such corrosion inhibitors include, without limitation, triazoles such as optionally substituted benzotriazole, tolyltriazole, and petroleum sulfonates. In one embodiment, the corrosion inhibitor is an optionally substituted benzotriazole. In another embodiment, the corrosion inhibitor is of the following structure, wherein $R^9$ is H, $C_1$ to $C_{10}$ alkyl, or $C_1$ to $C_6$ hydroxyalkyl, $R^{10}$ is H or $CH_2NR^{11}_2$ and $R^{11}$ is H or $C_1$ to $C_6$ alkyl. In one embodiment, $R^9$ is $CH_2CH_2OH$. In another embodiment, $R^{10}$ is H. In a further embodiment, $R^{10}$ is $CH_2NR^{11}_2$. In a further embodiment, $R^{10}$ is $CH_2N(CH_3)_2$. In yet another embodiment, the optionally substituted benzotriazole is selected from among tolyltriazole, 1,2,4-benzotriazole, and 1,2,3-benzotriazole.

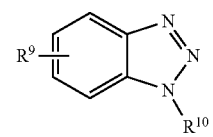

In one embodiment, the hydraulic fluid composition contains sufficient amounts of the corrosion inhibitor to prevent corrosion of the metal equipment. In one embodiment, the hydraulic fluid composition contains about 0.001 to about 3% w/w of the corrosion inhibitor. In another embodiment, the hydraulic fluid composition contains about 0.05 to about 1% w/w, i.e., 0.05, 0.1, 0.2, 0.3, 0.4, 0.5, 0.6, 0.7, 0.8, 0.9, or 1% w/w or fractions there between, of the corrosion inhibitor.

(d) Biocide

The hydraulic fluid compositions may also contain a biocide. By doing so, metals in contact with the hydraulic fluid compositions may be contacted with water, e.g., sea water, and be protected against colonization by marine organisms. The addition of the biocide depends on the requirements of the manufacturing process and other components on the formulation and can be determined by one of skill in the art. The biocide desirably reduces or prevents bioaccumulation of anaerobic or aerobic bacteria, such as sulfate-reducing bacteria, denitrifying bacteria, slime-forming bacteria, yeast, molds, and protozoa on metal equipment.

In one embodiment, the biocide is water-soluble. In another embodiment, the biocide is 5-methylsulfonyl-3-p-chlorophenyl-1,2,4-thiadiazole, 5-methylsulfonyl-3-p-nitrophenyl-1,2,4-thiadiazole, 5-methylsulfonyl-3-p-tolyl-1,2,4-thiadiazole, 5-methylsulfonyl-3-(2,4-dichloro)phenyl-1,2,4-thiadiazole, 2,4,5,6-tetrachloroisophthalonitrile, triazine, 2-methylthio-4-tert-butylamino-6-cyclopropylamino-triazine, 2-thiocyanomethylthiobenzothiazole, 3-(3,4-dichlorophenyl)-1,1-dimethylurea, 3-iodo-2-propynylbutylcarbamate, dibromosuccinate, diphenylamine, isothiazolone, zinc or manganese ethylenebisdithiocarbamate, zinc pyrithione, n-butyl tetradecyl phosphonium chloride, chlorine, hypochlorite, hypochlorite salts (such as sodium, lithium, or calcium hypochlorite); bromine, hypobromite salts (such as sodium, lithium, or calcium hypobromite), bromine chloride, hydroxyl radical, chlorine dioxide, hydrogen peroxide, sodium hydroxide, hydrogen peroxide, chloramines, tetrahydro-3,5-dimethyl-2H-1,3,5-thiadiazine-2-thione, 5-chloro-2-methyl-4-isothiazolin-3-one, 2-methyl-4-isothiazolin-3-one, 1,2-benzisothiazolin-3-one, tetrakis(hydroxymethyl)phosphonium sulfate, zinc pyrithione, 2-(thiocyanomethylthio)benzothiazole, 2,2-dibromo-3-nitropropionamide, benzalkonium chloride, benzyl $C_{10-16}$ alkyldimethyl ammonium chloride, didecyl-dimethyl-ammonium chloride, formaldehyde, glutaraldehyde, N-coco alkyl-1,3,-propylenediamine acetate, alkyl-aryl triethylammonium chloride solution, methylene bis(thiocyanate), 2,2-dibromo-nitrilopropionamide, 2-bromo-2-nitropropane-1,3-diol, 2-methyl-5-nitroimidazole-1-ethanol, quaternary ammonium glutaraldehyde, biguanidine, alkyl dimethyl benzyl ammonium chloride, dialkyl dimethyl ammonium chloride, and tetrakishydroxymethyl phosphonium sulfate. In a further embodiment, the biocide is triazine. See, e.g., the biocides described in U.S. Pat. Nos. 5,332,430 and 8,276,663, which is incorporated by reference herein.

The hydraulic fluid composition generally contains about 1% to about 10% w/w of the biocide, i.e., 1, 2, 3, 4, 5, 6, 7, 8, 9, or 10% w/w or fractions there between. In one embodiment, the hydraulic fluid composition contains about 3 to about 7% w/w of the biocide.

(e) Pour Point Depressant

The hydraulic fluid composition may also contain a pour point depressant. In one embodiment, the pour point depressant is a glycol, i.e., a chemical compound containing two hydroxyl (OH) groups which are attached to different carbon atom. In another embodiment, the glycol is a polyalkylene glycol. In a further embodiment, the glycol is ethylene glycol, propylene glycol, butylene glycol, hexylene glycol, or combinations thereof. In another embodiment, the glycol is ethylene glycol.

The pour point depressant is desirably present in the hydraulic fluid in an amount of about 10 to about 30% w/w of the pour point depressant, i.e., about 10, 11, 12, 13, 14, 15, 16, 17, 18, 19, 20, 21, 22, 23, 24, 25, 26, 27, 28, 29, or 30% w/w or fractions there between. In one embodiment, the hydraulic fluid composition contains about 12 to about 20% w/w of the pour point depressant.

(f) Water

Water and/or EG may also be added to the hydraulic fluid concentrate for use as described herein. Water and/or EG may be included in the hydraulic fluid composition, thereby permitting use of the product by the customer without addition of further water and/or EG. Alternatively, water and/or EG is present in the hydraulic fluid concentrate in a sufficient amount to provide a stable solution for further dilution by the customer prior to use. Water and/or EG may also be added by the customer to the hydraulic fluid concentrate prior to use. However, more water and/or EG made be added to the hydraulic fluid concentrate to ensure that the final hydraulic fluid compositions contains sufficient water and/or EG for use by the customer.

In one embodiment, the hydraulic fluid concentrate is diluted with water and/or EG to form a hydraulic fluid composition which contains about 40 to about 75% w/w, i.e., 40, 45, 50, 55, 60, 65, 70, 75% w/w or fractions there between, of water and/or EG.

(g) Optional Components

Optional reagents may be included in the hydraulic fluid concentrate and/or composition and may be selected by those skilled in the art. These additional reagents include, but are not limited to, salts, buffers, pH adjustors, gas generators, enzymes, surfactants, fluid loss control additives, surfactants, tackifying agents, foamers, scale inhibitors, catalysts, clay control agents, friction reducers, antifoam agents, bridging agents, dispersants, flocculants, $H_2S$ scavengers, $CO_2$ scavengers, oxygen scavengers, lubricants, gelling agent, crosslinking agent, weighting agents, relative permeability modifiers, resins, wetting agents, adhesives, and coating enhancement agents.

C. Hydraulic Fluid Compositions and Products

The compositions described herein can be provided to the customer as a concentrated neat composition, i.e., the hydraulic fluid concentrate, requiring dilution. Alternatively, the customer may be provided a ready for use composition, requiring no dilution. In one embodiment, the carrier, e.g., water and/or EG, is included in the composition in the product, thereby permitting use of the product by the customer without addition of further water and/or EG. In another embodiment, the water and/or EG is present in the composition in sufficient amounts to provide a stable solution for further dilution by the customer prior to use.

When it is desirable for the customer to further dilute any of the hydraulic fluid concentrates discussed herein, the same is performed using water and/or EG as the diluent to provide the hydraulic fluid composition. In one embodiment, the hydraulic fluid composition contains about 1 to about 10% w/w, i.e., about 1, 2, 3, 4, 5, 6, 7, 8, 9, or 10% w/w or fractions there between, of the hydraulic fluid concentrate and about 90 to about 99% w/w, i.e., 90, 91, 92, 93, 94, 95, 96, 97, 98, or 99% w/w or fractions there between, of water and/or EG.

Accordingly, a product is provided and contains a first container containing a water-soluble phosphate ester and a second container comprising a sulfide compound containing at least one —S—S— linkage, at least 10 carbon atoms and at least one terminal carboxylate group, wherein said —S—S— linkage bridges two alkyl groups. Additional containers may be included with the first and second containers and include one or more of a third container containing one or more alkaline compound, a fourth container containing one or more dicarboxylic acid or salt thereof, a fifth container containing a water-soluble corrosion inhibitor, a sixth container containing a water-soluble biocide, and a seventh container containing a pour point depressant.

D. Methods Of Using The Hydraulic Fluid Compositions

As discussed above, the inventors found that when the hydraulic fluid compositions were applied to drilling equipment, there was a significant reduction in corrosion and biocidal accumulation of the equipment due to a synergistic interaction between the phosphate ester and sulfide compound. This advantage was particularly noted when utilized in applications were the equipment was in contact with water and specifically seawater, i.e., in marine environments. It was also discovered that this novel hydraulic fluid composition had very low toxicity to sea life as mandated by the Centre for Environment, Fisheries & Aquaculture Science (CEFAS).

The phrase "drilling equipment" as used herein refers to equipment utilized on land or sea (offshore), i.e., shallow or deep sea, for mining a natural product deep below the earth's surface, e.g., about 5,000 to about 20,000 feet below the earth's surface. The drilling equipment is, therefore, useful in obtaining oil, natural gas, or water from underground reservoirs (wells), to stimulate groundwater wells, or to precondition mining rock to cave. The drilling equipment requires the use of a hydraulic fluid composition as described herein in order to effectively utilize the drilling equipment. Although the hydraulic fluid composition can be utilized in several locations of the equipment, the inventors found that its use in the blow-out preventer was highly effective in monitoring or controlling well-head pressure of the well during drilling. Specifically, the hydraulic fluid was effective in presenting the uncontrolled flow of gas, oil, or another well fluid out of an underground well during drilling. The term "blowout preventer" as used herein describes an assembly of several stacked blowout preventers of varying type and function and manage the extreme erratic pressure and uncontrolled flow emanating from a well reservoir during drilling. Blowout preventers also prevent tubing, tools and drilling fluid from being blown out of the wellbore when a blowout threatens.

The hydraulic fluid composition may be applied to the drilling equipment using techniques and equipment known to those skilled in the art. See, e.g., "Hydraulic Fracturing and Natural Gas Drilling: Questions and Concerns", Schultz, Ed., 2011 and "Managed Pressure Drilling", Rehm et al., 2008, which are herein incorporated by reference. In one embodiment, the hydraulic fluid composition is contained in a bladder and is connected to the drilling equipment and, specifically, the assembly that needs to be pressurized. The hydraulic fluid composition may be then introduced at varying flow rates which are determined by those skilled in the art depending on the drilling conditions. In one embodiment, the flow rate of the hydraulic fluid varies depending on changes in the drilling conditions. In another embodiment, the hydraulic fluid composition is adsorbed onto a substrate and placed into a subterranean formation for time delayed release. In a further embodiment, the hydraulic fluid composition is coated directly onto a solid fluid loss control agent for application to the drilling equipment. In still another embodiment, the hydraulic fluid composition is dispersed onto a polymer encagement for release over time.

E. Specific Embodiments

In one embodiment, a hydraulic fluid concentrate is provided and contains a water-soluble phosphate ester and a sulfide compound. The sulfide compound contains at least one —S—S— linkage, at least 10 carbon atoms and at least one terminal carboxylate group, wherein the —S—S— linkage bridges two alkyl groups. In one aspect, the sulfide compound contains one —S—S— linkage. In another aspect, the sulfide compound contains a —S—S—S— linkage. In a further aspect, the sulfide compound contains a —S—S—S—S— linkage. In still another aspect, each alkyl group of the sulfide compound is terminated with a carboxylate. In yet a further aspect, the ratio of component (i) to (ii) is about 1:1 to about 4:1.

In another embodiment, a hydraulic fluid concentrate is provided and contains a water-soluble phosphate ester, a sulfide compound comprising at least one —S—S— linkage, at least 10 carbon atoms and at least one terminal carboxylate group, wherein the —S—S— linkage bridges two alkyl groups, one or more alkaline compound, one or more dicarboxylic acid or salt thereof, a water-soluble corrosion inhibitor, a water-soluble biocide, a pour-point depressant, and water, EG, or a combination thereof.

In a further embodiment, a hydraulic fluid composition is provided and contains about 1 to about 10% w/w of said hydraulic fluid concentrate described herein and about 90 to about 99% w/w of water, EG, or a combination thereof. In one aspect, the hydraulic fluid composition reduces seawater corrosion of a metal contacted with said hydraulic fluid composition. In another aspect, the hydraulic fluid composition reduces bioaccumulation in oil drilling equipment contacted with said hydraulic fluid composition. In a further aspect, the hydraulic fluid composition has low toxicity to sea life.

In yet another embodiment, a product is provided and contains a first container containing a water-soluble phosphate ester, a second container containing a sulfide compound comprising at least one —S—S— linkage, at least 10 carbon atoms and at least one terminal carboxylate group, wherein the —S—S— linkage bridges two alkyl groups, a third container containing one or more alkaline compound, a fourth container containing one or more dicarboxylic acid or salt thereof, a fifth container containing a water-soluble corrosion inhibitor, a sixth container containing a water-soluble biocide, and a seventh container containing a pour point depressant.

In another embodiment, a method for monitoring or controlling well-head pressure of a well during drilling is provided and includes performing said drilling using a hydraulic fluid composition described herein.

In a further embodiment, a method for preventing uncontrolled flow of gas, oil, or another well fluid out of an underground formation during a drilling or extraction process is provided and includes performing said drilling or extraction using a hydraulic fluid composition described. In one aspect, the hydraulic fluid composition is applied to a blowout preventer. In another aspect, drilling is performed in a marine environment.

In still another embodiment, a method for drilling offshore oil or gas is provided and includes applying a hydraulic fluid composition described herein to the drilling equipment and drilling said offshore oil using said drilling equipment. In one aspect, the hydraulic fluid composition is applied to the blowout preventer of the drilling equipment.

The following examples are illustrative only and are not intended to limit the present invention.

EXAMPLES

Example 1

A hydraulic fluid composition described herein was prepared and contained the components, all of which are available from commercial vendors, of Table 1.

TABLE 1

| Component | Amount (%) |
|---|---|
| water | 60.35 |
| monoethanolamine | 8 |
| triethanolamine | 2 |
| mixture of $C_3$ to $C_{13}$ dicarboxylic acids | 3 |
| 9-octadecenoic acid (9Z), sulfurized | 3 |
| 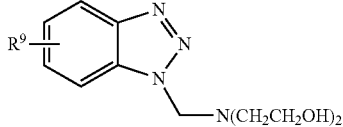 | 0.1 |
| oleyl alcohol, ethoxylated, phosphate | 2.5 |
| triazine | 6 |
| ethylene glycol | 15 |
| dye | 0.05 |

The sea water stability (ASTM D1141 procedure), falex coefficient of friction (modified ASTM D3233-B procedure), falex breakdown load (modified ASTM D3233-B procedure), falex wear @1000 pounds (modified API 17F standard), 4 ball wear test (ASTM D2783-88 procedure), piston pump wear (Vickers PFB 5 pump), and Cefas rating (offshore chemical notification scheme—OCNS) were estimated using the noted standard techniques for the composition of Table 1 and the composition of Stack-Magic ECO-Fv2. The results are shown Table 2.

TABLE 2

| Property | Stack-Magic ECO-Fv2 | Instant Composition |
|---|---|---|
| Sea Water Stability | orange | green |
| Falex Coefficient of Friction | orange | green |
| Falex breakdown load | orange | green |
| Falex wear @1000 lbs | orange | green |
| 4 Ball | red | orange |
| Piston Pump Wear | orange | green |
| Cefas Rating | green | not determined | red = unacceptable,
orange = borderline acceptable,
green = acceptable

These results illustrate that the claimed hydraulic fluid composition discussed herein is potentially superior to two commercially available hydraulic fluids.

Example 2

Five formulations were prepared which all contain the same corrosion inhibitors, biocide components, ethylene glycol, and water (base formulation), deviating from each other only in the concentration of phosphate ester of ethoxylated oleyl alcohol and sulfurized oleic acid according to Table 3. All of these components are commercially available.

TABLE 3

| | Composition | | | | |
|---|---|---|---|---|---|
| Component (%) | 1 | 2 | 3 | 4 | 5 |
| phosphate ester of ethoxylated oleyl alcohol | 2.5 | 5.5 | 2.5 | 0 | 0 |
| 9-octadecenoic acid (9Z), sulfurized | 0 | 0 | 3 | 3 | 5.5 |
| 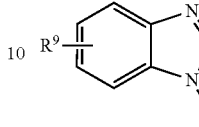 | | | 0.1 | | |
| triazine | | | 6 | | |
| ethylene glycol | | | 15 | | |

The load was applied according to ASTM D3233 standard testing and the torque determined for each composition and the results are provided in Table 4. A plot of the load vs. torque was generated (FIG. 1) and the coefficients of friction determined form the slopes.

TABLE 4

| | Composition | | | | |
|---|---|---|---|---|---|
| Load (lbs) | 1 | 2 | 3 | 4 | 5 |
| | Torque (inch-lbs) | | | | |
| 250 | 11 | 10 | 4 | 11 | 9 |
| 500 | 17 | 16 | 9 | 22 | 16 |
| 750 | 20 | 20 | 13 | | |
| 1000 | 43 | 24 | 18 | | |
| 1250 | 50 | 34 | 29 | | |
| 1500 | | 51 | 33 | | |
| 1750 | | | 36 | | |
| 2000 | | | 39 | | |
| 2250 | | | 41 | | |
| 2500 | | | 45 | | |
| 2750 | | | 50 | | |
| 3000 | | | 52 | | |
| 3250 | | | 55 | | |
| 3500 | | | 60 | | |

The data illustrates that the highest loads and lowest coefficients of friction are obtained only when the phosphate ester and sulfide compound are used in conjunction and cannot be obtained by similar quantities of either phosphate ester or sulfide compound independently. The combination also provides better stability to hard water than formulations containing only phosphate ester or sulfide compound.

All publications cited in this specification and priority application, including U.S. Provisional Patent Application No. 61/872,664, filed Aug. 31, 2013, are incorporated herein by reference. While the invention has been described with reference to particular embodiments, it will be appreciated that modifications can be made without departing from the spirit of the invention. Such modifications are intended to fall within the scope of the appended claims.

What is claimed is:

1. An aqueous hydraulic fluid concentrate comprising:
   (a) a phosphate ester that substantially dissolves in water;
   (b) a sulfide compound comprising at least one S—S linkage, at least 10 carbon atoms, and at least one terminal carboxylate group, wherein said S—S linkage bridges two alkyl groups; wherein the ratio of the phosphate ester to the sulfide compound is between 1:1 and 4:1; and
   (c) water.

2. The hydraulic fluid concentrate of claim 1, further comprising one or more of:

an alkaline compound;
a dicarboxylic acid or salt thereof;
a water-soluble corrosion inhibitor;
a water-soluble biocide;
a pour-point depressant; and
ethylene glycol.

3. The hydraulic fluid concentrate according to claim 2, wherein said alkaline compound is an alkanolamine.

4. The hydraulic fluid concentrate according to claim 3, wherein said alkanolamine is monoethanolamine, triethanolamine, or a combination thereof.

5. The hydraulic fluid concentrate according to claim 2, wherein said corrosion inhibitor is an optionally substituted benzotriazole.

6. The hydraulic concentrate according to claim 5, wherein said benzotriazole is of the structure:

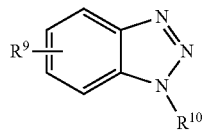

(i) wherein:
$R^9$ is H, $C_1$ to $C_{10}$ alkyl, or $C_1$ to $C_6$ hydroxyalkyl; and
$R^{10}$ is H or $CH_2NR^{11}{}_2$; and
$R^{11}$ is H or $C_1$ to $C_6$ alkyl; or
  (ii) the compound of (i), wherein $R^9$ is $CH_2CH_2OH$; or
  (iii) the compound of (i), wherein $R^{11}$ is $CH_3$; or
  (iv) the compound of (i), wherein said optionally substituted benzotriazole is selected from the group consisting of tolyltriazole, 1,2,4-benzotriazole, and 1,2,3-benzotriazole.

7. The hydraulic fluid concentrate according to claim 2, wherein said dicarboxylic acid is a $C_8$ to $C_{18}$ dicarboxylic acid or a $C_{10}$ to $C_{12}$ dicarboxylic acid or wherein said pour point depressant is a glycol or is ethylene glycol or wherein said water-soluble biocide is triazine.

8. The hydraulic fluid concentrate according to claim 2, comprising about 40 to about 75% w/w of water, or a combination of water and ethylene glycol.

9. The hydraulic fluid concentrate according to claim 1, wherein said phosphate ester has the structure:

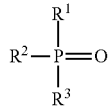

wherein:
$R^1R^2$, and $R^3$ are, independently, OH, optionally substituted $C_1$ to $C_{30}$ alkoxy, optionally substituted —O—$(CH_2O)_n$—($C_1$ to $C_{30}$ alkyl), optionally substituted —O—$(CH_2O)_n$—($C_2$ to $C_{30}$ alkenyl), optionally substituted —O—$(CH_2O)_n$—($C_2$ to $C_{30}$ alkynyl), —O—$(CH_2CH_2O)_n$—($C_1$ to $C_{30}$ alkyl), —O—$(CH_2CH_2O)_n$—($C_2$ to $C_{30}$ alkenyl), —O—$(CH_2CH_2O)_n$—($C_2$ to $C_{30}$ alkynyl), —O—$(CH_2CH(CH_3)O)_n$—($C_1$ to $C_{30}$ alkyl), —O—$(CH_2CH(CH_3)O)_n$—($C_2$ to $C_{30}$ alkenyl), —O—$(CH_2CH(CH_3)O)_n$—($C_2$ to $C_{30}$ alkynyl), —O—$(CH_2O)_n(CH_2CH(CH_3)O)_n$—($C_1$ to $C_{30}$ alkyl), —O—$(CH_2O)_n(CH_2CH(CH_3)O)_n$—($C_2$ to $C_{30}$ alkenyl), —O—$(CH_2O)_n(CH_2CH(CH_3)O)_n$—($C_2$ to $C_{30}$ alkynyl), —O—($C_1$ to $C_{30}$ alkyl)—$(OCH_2)_n$—($C_1$ to $C_{30}$ alkyl), optionally substituted —O—($C_1$ to $C_{30}$ alkyl)—$(OCH_2CH_2)_n$—($C_1$ to $C_{30}$ alkyl), optionally substituted —O—($C_1$ to $C_{30}$ alkyl)—$(OCH_2CH(CH_3))_n$—($C_1$ to $C_{30}$ alkyl), optionally substituted —O—($C_1$ to $C_{30}$ alkyl)-$(OCH_2)_n$—($C_2$ to $C_{30}$ alkenyl), optionally substituted —O—($C_1$ to $C_6$ alkyl)$OR^AOR^B$; and $R^A$ and $R^B$ are, independently, $C_1$ to $C_{30}$ alkyl, $C_2$ to $C_{30}$ alkenyl, or $C_2$ to $C_{30}$ alkynyl.

10. The hydraulic fluid concentrate according to claim 1, wherein said phosphate ester is:
a $C_6$ to $C_{18}$ trialkoxyalkyl phosphate ester, each alkoxyalkyl moiety comprising 1 part by weight of an ester or a mixture of esters selected from the group consisting of a trialkyl ester of phosphoric acid and $C_4$ to $C_9$ alkyl alcohols; or
a $C_6$ to $C_{10}$ trialkyloxyalkyl phosphate ester comprising butoxyethyl, phenoxyethyl, octoxyethyl, butoxybutyl moieties.

11. The hydraulic fluid concentrate according to claim 1, wherein said sulfide compound contains one —S—S— linkage; or a —S—S—S— linkage; or a —S—S—S—S— linkage.

12. The hydraulic fluid concentrate according to claim 1, wherein each of said alkyl group bridged by said S—S linkage is terminated with a carboxylate or an amide.

13. The hydraulic fluid concentrate according to claim 1, wherein said sulfide compound is sulfurized 9-octadecenoic acid comprising at least one terminal amide group on said alkyl.

14. An aqueous hydraulic fluid composition comprising:
(a) about 1 to about 10% w/w of said hydraulic fluid concentrate of claim 1; and
(b) about 90 to about 99% w/w of water, or a combination of water and ethylene glycol.

15. A method for monitoring or controlling well-head pressure of a well during drilling or for preventing uncontrolled flow of gas, oil, or another well fluid out of an underground formation during a drilling or extraction process, said method comprising:
(a) performing said drilling or extraction using a hydraulic fluid composition of claim 14;
(b) applying said hydraulic fluid to a blowout preventer; or
(c) performing (a) or (b) in a marine environment.

16. A method for drilling offshore oil or gas, said method comprising:
(a) applying said hydraulic fluid composition of claim 14 to the drilling equipment; and
(b) drilling said offshore oil using said drilling equipment; and
(c) optionally applying said hydraulic fluid composition to the blowout preventer of said drilling equipment.

17. The hydraulic fluid concentrate according to claim 1, wherein said phosphate ester is olelyl alcohol ethoxylated phosphate.

18. A product comprising:
(i) a first container comprising a phosphate ester that substantially dissolves in water;
(ii) a second container comprising a sulfide compound comprising at least one —S—S— linkage, at least 10 carbon atoms and at least one terminal carboxylate group, wherein said —S—S— linkage bridges two alkyl groups;
(iii) a third container comprising one or more alkaline compound;

(iv) a fourth container comprising one or more dicarboxylic acid or salt thereof;
(v) a fifth container comprising a water-soluble corrosion inhibitor;
(vi) a sixth container comprising a water-soluble biocide; and
(vii) a seventh container comprising a pour point depressant.

19. An aqueous hydraulic fluid composition comprising:
(a) from 0.5 to 10% w/w of a phosphate ester that substantially dissolves in water;
(b) about 1 to 10% by weight of a sulfide compound comprising at least one S—S linkage, at least 10 carbon atoms and at least one terminal carboxylate group, wherein said S—S linkage bridges two alkyl groups; wherein the ratio of the phosphate ester to the sulfide compound is between 1:1 and 4:1;
(c) about 1 to 12% by weight of one or a combination of alkaline compounds sufficient to maintain a pH>7;
(d) about 1 to 10% by weight dicarboxylic acid or salt thereof;
(e) about 0.001 to 3% by weight of a corrosion inhibitor;
(f) about 1 to 10% of a biocide that substantially dissolves in water;
(g) about 10 to 30% by weight of a pour-point depressant; and
(h) the balance water.

* * * * *